(12) United States Patent
Toyoda

(10) Patent No.: US 10,084,341 B2
(45) Date of Patent: Sep. 25, 2018

(54) UNINTERRUPTIBLE POWER SOURCE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 106 days.

(21) Appl. No.: 15/316,783

(22) PCT Filed: Jun. 26, 2014

(86) PCT No.: PCT/JP2014/066988
§ 371 (c)(1),
(2) Date: Dec. 6, 2016

(87) PCT Pub. No.: WO2015/198448
PCT Pub. Date: Dec. 30, 2015

(65) Prior Publication Data
US 2017/0149276 A1 May 25, 2017

(51) Int. Cl.
*H02J 9/00* (2006.01)
*H02J 9/06* (2006.01)
*H02J 3/00* (2006.01)

(52) U.S. Cl.
CPC ............... *H02J 9/062* (2013.01); *H02J 3/005* (2013.01)

(58) Field of Classification Search
CPC .................................. H02J 9/062; H02J 3/005
USPC ............................................................ 307/64
See application file for complete search history.

(56) References Cited

U.S. PATENT DOCUMENTS 7,372,177 B2    5/2008   Colombi et al.

OTHER PUBLICATIONS

International Search Report dated Aug. 19, 2014 in PCT/JP14/066988 Filed Jun. 26, 2014.

*Primary Examiner* — Richard Tan
(74) *Attorney, Agent, or Firm* — Oblon, McClelland, Maier & Neustadt, L.L.P.

(57) ABSTRACT

An uninterruptible power source includes an eco-mode for supplying power from an AC power source to a load via a contactor. In the eco-mode, when a degree of voltage drop of the AC power source reaches 5%, a switching controller turns on a thyristor switch and then turns off a contactor. When the degree of voltage drop of the AC power source reaches 10%, a power conversion controller is configured to cause an inverter to invert DC power of a battery into AC power, and control the inversion in the inverter to synchronize the AC voltage output from the inverter to the AC voltage supplied from the AC power source. When the inversion in the inverter is performed after turning off contactor, the switching controller is configured to turn off the thyristor switch.

5 Claims, 11 Drawing Sheets

US 10,084,341 B2

UNINTERRUPTIBLE POWER SOURCE

TECHNICAL FIELD

The present invention relates to an uninterruptible power source, in particular, an uninterruptible power source having an eco-mode in which AC power is supplied to a load via a bypass circuit.

BACKGROUND ART

Conventionally, an uninterruptible power source includes: a converter configured to convert AC power from an AC power source into DC power; an inverter configured to convert (i) DC power generated by the converter or DC power of a power storage device into (ii) AC power and supply the AC power to a load; a bypass circuit including a thyristor switch and a contactor connected in parallel between the AC power source and the load; and a controller configured to control these.

In the uninterruptible power source, in a normal state in which AC power is normally supplied from the AC power source, the converter and the inverter are used, whereas in a power failure state in which the supply of AC power from the AC power source is stopped, supply of power is continued using the inverter. Such a type of circuit is called "on-line type". In the on-line type, when the AC power source is normal and also when power failure takes place, power is supplied to the load using the inverter via a DC link, so that quality of output power is readily secured irrespective of quality of input power, thus attaining excellent stability of supply of power to the load. Meanwhile, the on-line type has a problem in terms of improvement in operation efficiency because power loss occurs due to energy passing through the converter and the inverter in the normal state.

In recent years, for increase in efficiency, an uninterruptible power source having an eco-mode has been proposed (for example, see U.S. Pat. No. 7,372,177 (Patent Document 1)). According to Patent Document 1, in the normal state, the uninterruptible power source performs bypass power supply to supply AC power from an AC power source to a load via a thyristor switch serving as a bypass circuit. Moreover, if a malfunction is detected in a bypass path during the execution of the bypass power supply, switching is performed from the bypass power supply to inverter power supply in which AC power is supplied from the inverter to the load.

CITATION LIST

Patent Document

PTD 1: U.S. Pat. No. 7,372,177

SUMMARY OF INVENTION

Technical Problem

In the uninterruptible power source described in Patent Document 1, the converter and the inverter are non-operational during the execution of the bypass power supply. Then, when a control panel detects a malfunction in the bypass path, the thyristor switch is turned off, and the inverter is started with a delay of a predetermined period. Accordingly, when switching from the bypass power supply to the inverter power supply, momentary voltage drop, i.e., momentary drop of voltage output to the load, takes place, disadvantageously.

When a bypass circuit is constructed by combining a thyristor switch and a contactor, the contactor is turned off with a delay after the thyristor switch is turned off because response time of the contactor is longer than response time of the thyristor switch. Accordingly, a degree of the momentary voltage drop (time of momentary voltage drop and magnitude of voltage drop) becomes large, with the result that the load may be greatly affected.

In view of this, a main object of the present invention is to provide an uninterruptible power source in which occurrence of momentary voltage drop can be prevented when switching from (i) power supply in an eco-mode in which AC power is supplied to a load via a bypass circuit to (ii) inverter power supply.

Solution to Problem

An uninterruptible power source according to the present invention is connected between an AC power source and a load. The uninterruptible power source includes: a converter configured to rectify AC power supplied from the AC power source into DC power; an inverter configured to invert the DC power output by the converter or DC power output by a power storage device into AC power, and to supply the AC power to the load; a bypass circuit including a semiconductor switch and a contactor connected in parallel between the AC power source and the load; a power conversion controller configured to control the power conversion in each of the converter and the inverter; and a switching controller configured to control on/off of the semiconductor switch and the contactor. The uninterruptible power source has (i) a first operation mode in which AC power is supplied from the inverter to the load and (ii) a second operation mode in which AC power is supplied from the AC power source to the load via the bypass circuit, and the uninterruptible power source is configured to change over to the first operation mode when voltage drop of the AC power source is detected during the second operation mode. In the second operation mode, the switching controller is configured to turn on the contactor and turn off the semiconductor switch, and is configured to turn on the semiconductor switch and then turn off the contactor when a degree of voltage drop of the AC power source reaches a first threshold value. When the degree of voltage drop of the AC power source reaches the second threshold value smaller than the first threshold value during the second operation mode, the power conversion controller is configured to (i) control the inverter to invert the DC power output by the power storage device into AC power and (ii) control the inversion in the inverter to synchronize the AC voltage output from the inverter to the AC voltage supplied from the AC power source. The switching controller is configured to turn off the semiconductor switch when the power conversion controller controls the inverter to perform the inversion after turning off the contactor.

Preferably, the power conversion controller is configured to generate a gate signal for controlling the inverter to synchronize the AC voltage output from the inverter to the AC voltage supplied from the AC power source. In the second operation mode, the power conversion controller is configured to bring the inverter into an inversion standby state by stopping output of the gate signal, and is configured to output the gate signal to the inverter when the degree of voltage drop of the AC power source reaches the second threshold value.

Preferably, when detecting power recovery to resume the supply of the AC power from the AC power source after changing over to the first operation mode, the uninterruptible power source is configured to return to the second operation mode. In the first operation mode, in response to detecting the power recovery of the AC power source, the power conversion controller is configured to control the inversion in the inverter to synchronize the AC voltage output from the inverter to the AC voltage supplied from the AC power source after the power recovery. When the AC voltage output from the inverter synchronizes to the AC voltage supplied from the AC power source after the power recovery, the switching controller is configured to sequentially turn on the semiconductor switch and the contactor and turn off the semiconductor switch after the contactor is turned on.

Preferably, the uninterruptible power source further includes: an input terminal configured to receive AC power from the AC power source and supply the AC power to the converter; a bypass terminal configured to receive AC power from the AC power source; a first switch connected between the bypass terminal and the bypass circuit; a second switch connected between a first node and the bypass circuit, the first node being located between the input terminal and an AC terminal of the converter; and a third switch connected between the input terminal and the first node. In the second operation mode, the switching controller is configured to supply, to the load via the contactor, the AC power supplied to the input terminal, by turning on the second and third switches and turning off the first switch.

Preferably, the uninterruptible power source further includes: an input terminal configured to receive AC power from the AC power source and supply the AC power to the converter; and a bypass terminal configured to receive AC power from the AC power source and supply the AC power to the bypass circuit. In the second operation mode, the switching controller is configured to supply, to the load via the contactor, the AC power supplied to the bypass terminal.

Advantageous Effects of Invention

According to the present invention, in the uninterruptible power source having the eco-mode in which AC power is supplied to the load via the bypass circuit, occurrence of momentary voltage drop can be prevented upon switching from the power supply in the eco-mode to the inverter power supply. Accordingly, the operation efficiency of the uninterruptible power source can be improved while securing stability of supply of power to the load.

DESCRIPTION OF EMBODIMENTS

Figure 1:
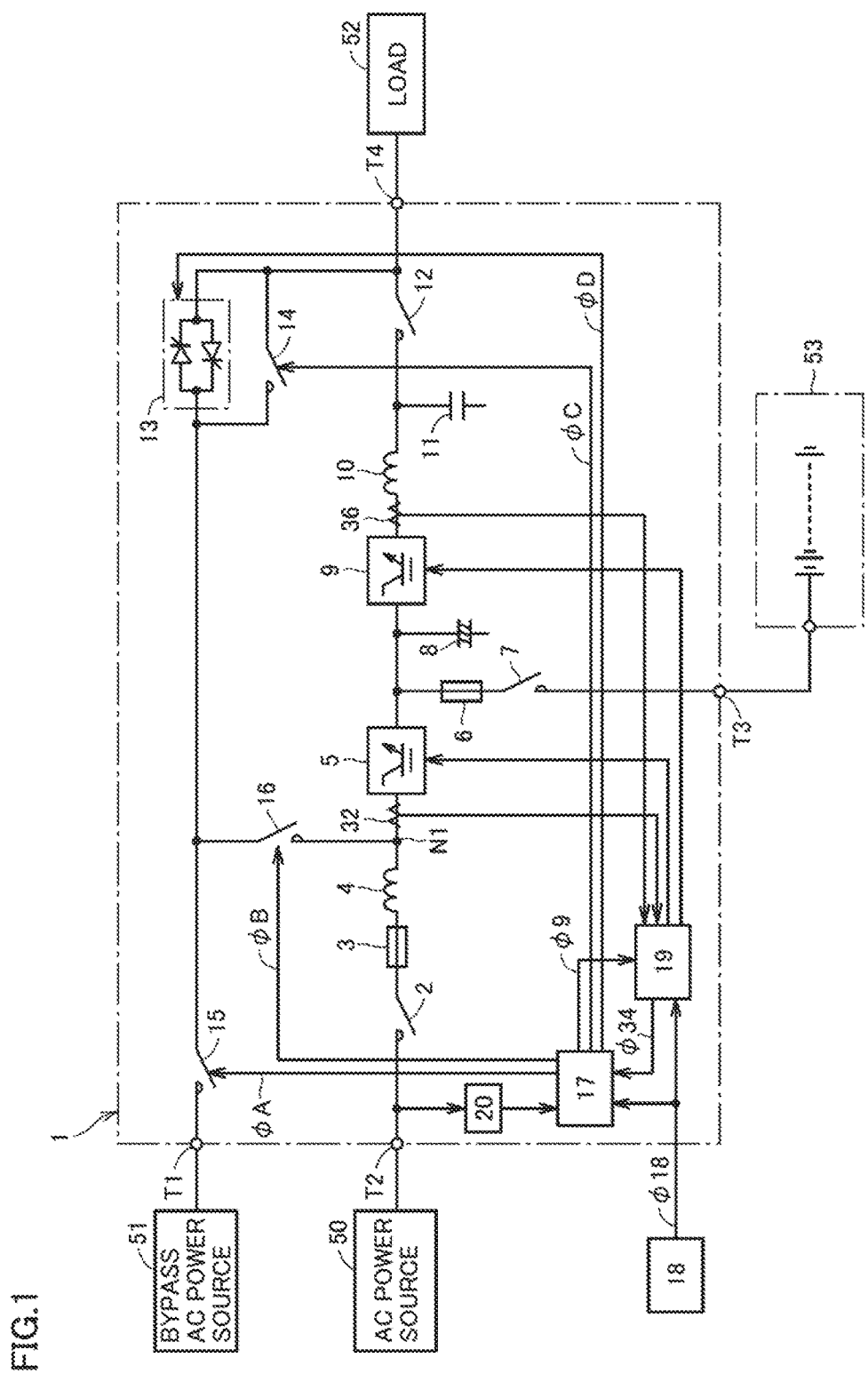
FIG. 1 is an entire configuration diagram of an uninterruptible power source according to a first embodiment of the present invention.

The following describes an embodiment of the present invention in detail with reference to figures. It should be noted that the same or corresponding components will be given the same reference characters and are not described repeatedly.

[First Embodiment]

FIG. 1 is an entire configuration diagram of an uninterruptible power source according to a first embodiment of the present invention. With reference to FIG. 1, the uninterruptible power source according to the first embodiment of the present invention is connected to an AC power source 50, a bypass AC power source 51 and a load 52.

Each of AC power source 50 and bypass AC power source 51 is an AC power source for supplying AC power to the uninterruptible power source. Each of such AC power sources is constituted of a commercial AC power source or a private power generator, for example. In FIG. 1 and figures described below, a three-phase three-wire type AC power source is illustrated as an exemplary AC power source. For simplicity of the figures and description, FIG. 1 representatively shows only a circuit for one phase. However, the AC power source should not be limited to the three-phase three-wire type AC power source, and may be a three-phase four-wire type power source or a single-phase three-wire type power source, for example.

The uninterruptible power source includes: a housing 1; a main body portion accommodated in housing 1; a battery 53 electrically connected to the main body portion; and a bypass terminal T1, an input terminal T2, a battery terminal T3, and an output terminal T4 each provided in housing 1.

Bypass terminal T1 receives AC power from bypass AC power source 51. Input terminal T2 receives AC power from AC power source 50. Battery terminal T3 is connected to the positive electrode of battery 53. Battery 53 is accommodated in a housing different from housing 1. Load 52 is connected to output terminal T4.

As the main body portion, the uninterruptible power source includes: electromagnetic contactors (contactors) 2, 7, 12, 14, 15, 16; fuses 3, 6; reactors 4, 10; a converter (rectifier) 5; an electrolytic capacitor 8; an inverter 9; a capacitor 11; a thyristor switch 13; a switching controller 17; an eco-mode setting unit 18; a power conversion controller 19; a voltage detection circuit 20; and current transformers 32, 36. Among these, contactor 2, fuse 3, reactor 4, converter 5, inverter 9, reactor 10, and contactor 12 are connected in series between input terminal T2 and output terminal T4.

Contactor 2 is connected to an electric conduction path between input terminal T2 and converter 5. During a normal state in which three-phase AC power is normally supplied from AC power source 50, contactor 2 is closed (on), whereas during maintenance of the uninterruptible power source, contactor 2 is opened (off), for example. Fuse 3 is provided in the electric conduction path between input terminal T2 and converter 5 in order to prevent overcurrent from flowing in from AC power source 50. Reactor 4 is provided to allow AC power from AC power source 50 to pass therethrough and is provided such that a signal having a switching frequency and generated by converter 5 is prevented from being propagated to AC power source 50.

Each of converter 5 and inverter 9 is constituted of a semiconductor switching element. As the semiconductor switching element, an IGBT (Insulated Gate Bipolar Transistor) is used, for example. Moreover, as a method for controlling the semiconductor switching element, PWM (Pulse Width Modulation) control can be applied.

During the normal state, converter 5 converts (rectifies) (i) the three-phase AC power supplied from AC power source 50 into (ii) DC power. The DC power generated by converter 5 is supplied to inverter 9 and battery 53. Meanwhile, in the power failure state in which the supply of three-phase AC power from AC power source 50 is stopped, converter 5 is non-operational.

Electrolytic capacitor 8 is connected to the output terminal of converter 5 to smooth output voltage of converter 5. In the normal state, inverter 9 converts (i) the DC power smoothed by electrolytic capacitor 8 into (ii) three-phase AC power of commercial frequency. On the other hand, in the power failure state, inverter 9 converts DC power of battery 53 into three-phase AC power of commercial frequency. The power conversion in each of converter 5 and inverter 9 is controlled by power conversion controller 19.

Reactor 10 and capacitor 11 constitute a filter for removing a component of switching frequency included in the AC power output from inverter 9.

Contactor 12 is on during inverter power supply in which AC power is supplied from inverter 9 to load 52. On the other hand, contactor 12 is off during bypass power supply in which AC power is supplied from bypass AC power source 51 to load 52 via thyristor switch 13 and contactor 14. It should be noted that contactor 12 is on during execution of an eco-mode described later.

Thyristor switch 13 and contactor 14 are connected in parallel between bypass terminal T1 and output terminal T4. Thyristor switch 13 is on when a control signal ϕD from switching controller 17 is at the H (logic high) level, and is off when control signal ϕD is at the L (logic low) level. In response to control signal ϕD, thyristor switch 13 becomes on only for a predetermined time when changing over from the inverter power supply to the bypass power supply. Contactor 14 is on when control signal ϕC from switching controller 17 is at the H level, and is off when control signal ϕC is at the L level. In response to control signal ϕC, contactor 14 becomes off during the inverter power supply and becomes on during the bypass power supply.

Thyristor switch 13 and contactor 14 constitute a bypass circuit. The bypass circuit has one terminal connected to output terminal T4. Contactor 15 is connected between bypass terminal T1 and the other terminal of the bypass circuit. Contactor 15 is on when control signal ϕA from switching controller 17 is at the H level, and is off when control signal ϕA is at the L level.

Contactor 16 is connected between (i) a node N1 (first node) located between input terminal T2 and the AC terminal of converter 5 and (ii) the other terminal of the bypass circuit. Contactor 16 is on when control signal ϕB from switching controller 17 is at the H level, and is off when control signal ϕB is at the L level.

Battery 53 is a power storage device for supplying DC power to inverter 9 during power failure. In the normal state, battery 53 stores DC power generated by converter 5. Fuse 6 and contactor 7 are connected in series between the DC side terminal of converter 5 and battery terminal T3. Contactor 7 is on in the normal state, and is turned off upon maintenance of the uninterruptible power source and battery 53, for example. Fuse 6 prevents overcurrent from flowing into converter 5 and battery 53.

Figure 2:
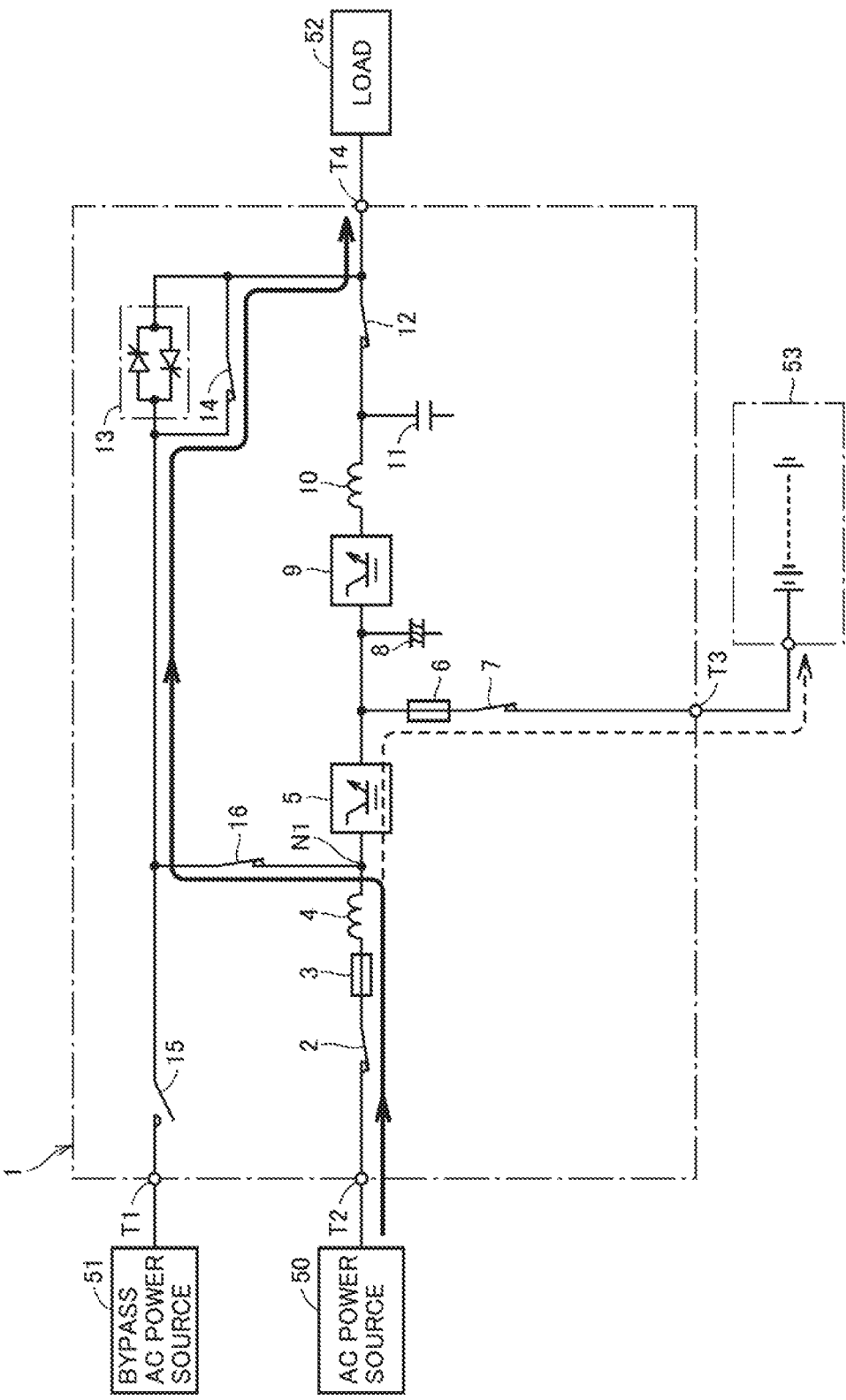
FIG. 2 illustrates a flow of power during execution of an eco-mode in the first embodiment of the present invention.

The uninterruptible power source according to the first embodiment of the present invention has the eco-mode as an operation mode. The eco-mode is an operation mode in which high operation efficiency of the uninterruptible power source is considered as being important in the normal state in which three-phase AC power is normally supplied from AC power source 50. FIG. 2 illustrates a flow of power during execution of the eco-mode.

Generally, in the normal state, the uninterruptible power source is configured such that converter 5 converts (i) three-phase AC power supplied from AC power source 50 into (ii) DC power and inverter 9 converts the DC power into three-phase AC power and supplies it to load 52. However, the configuration described above has such a problem that operation efficiency of the uninterruptible power source is decreased due to occurrence of power loss involved in power conversion in each of converter 5 and inverter 9.

In the eco-mode, as indicated by a solid line arrow in FIG. 2, three-phase AC power supplied from AC power source 50 is supplied to load 52 via thyristor switch 13 and contactor 14. That is, the three-phase AC power is supplied to load 52 without passing through converter 5 and inverter 9. Accordingly, power loss is suppressed in converter 5 and inverter 9, thus improving the operation efficiency of the uninterruptible power source. It should be noted that also during the execution of the eco-mode, converter 5 is operated as required, whereby DC power can be stored in battery 53 as indicated by a dotted line arrow in FIG. 2.

With reference to FIG. 1 again, eco-mode setting unit 18 receives, from a high-order controller (not shown), an eco-mode operation command for requesting execution of the eco-mode. The eco-mode may be requested in the following manner: for example, a switch for requesting the eco-mode is provided at an external portion of housing 1, and the eco-mode operation command is activated when this switch is turned on by the user. Alternatively, the eco-mode operation command may be automatically activated in accordance with a predetermined schedule or the like without providing the switch or the like.

When the eco-mode operation command is received, eco-mode setting unit 18 sets the operation mode of the uninterruptible power source at the eco-mode. Eco-mode setting unit 18 generates an eco-mode setting signal 18 indicating that the operation mode has been set at the eco-mode, and outputs generated eco-mode setting signal ϕ18 to switching controller 17 and power conversion controller 19.

When eco-mode setting signal ϕ18 is received from eco-mode setting unit 18, switching controller 17 switches the operation mode to the eco-mode from the normal mode in which the three-phase AC power from AC power source 50 is supplied to load 52 via converter 5 and inverter 9. Specifically, when eco-mode setting signal ϕ18 is received, switching controller 17 controls contactors 14, 15, 16 and thyristor switch 13 to form a power path between AC power source 50 and load 52 as shown in FIG. 2. Switching controller 17 sets control signals ϕB, ϕC, ϕD at the H level to turn on contactors 16, 14 and thyristor switch 13.

The response time of thyristor switch 13 is very short, so that thyristor switch 13 immediately becomes on when control signal ϕD is set at the H level. On the other hand, the response time of contactor 14 is longer than the response time of thyristor switch 13, so that contactor 14 actually becomes on after passage of a predetermined response time from the setting of control signal ϕC at the H level. After contactor 14 becomes on, switching controller 17 sets control signal ϕD at the L level to turn off thyristor switch 13. Accordingly, the three-phase AC power supplied from AC power source 50 passes through reactor 4 and then is led to output terminal T4 via node N1 and contactor 14.

When the eco-mode setting signal is received from eco-mode setting unit 18, power conversion controller 19 operates converter 5 to store DC power in battery 53. Specifically, power conversion controller 19 controls rectification in converter 5 in accordance with the remaining state of charge in battery 53 in order to bring battery 53 into a predetermined fully charged state.

Further, power conversion controller 19 generates a gate signal for turning on/off a semiconductor switching element included in inverter 9 during the execution of the eco-mode. Power conversion controller 19 generates the gate signal such that three-phase AC voltage synchronized to the three-phase AC voltage supplied from AC power source 50 is output from inverter 9. However, power conversion controller 19 does not output the generated gate signal to the gate drive circuit provided in inverter 9 during the execution of the eco-mode. Hence, inverter 9 is not operated during the execution of the eco-mode, and is therefore in a standby state (gate signal input waiting state) until a gate signal is received from power conversion controller 19.

Voltage detection circuit 20 detects an instantaneous value of the three-phase AC voltage supplied from AC power source 50, and provides switching controller 17 with a signal indicating the detected value. Current transformer 32 detects AC supplied to converter 5, and provides power conversion controller 19 with a signal indicating the detected value. Current transformer 36 detects the AC supplied from inverter 9 to output terminal T4, and provides power conversion controller 19 with a signal indicating the detected value.

During the execution of the eco-mode, switching controller 17 detects voltage drop of AC power source 50 based on the output signal of voltage detection circuit 20. When the voltage drop of AC power source 50 is detected, switching controller 17 generates a starting command ϕ9 for starting inverter 9 that is in the standby state. Switching controller 17 outputs generated starting command ϕ9 to power conversion controller 19. When inverter 9 is started in response to this starting command ϕ9, the uninterruptible power source is switched from the power supply in the eco-mode to the inverter power supply.

Here, in order to switch from the power supply in the eco-mode to the inverter power supply, contactor 14 needs to be turned off. Contactor 14 is a mechanical interrupter, and is turned off when a main contact is opened by interrupting electric conduction. Accordingly, after switching controller 17 sets control signal ϕC at the L level, contactor 14 actually becomes off at a timing which comes every half cycle of the AC and at which the current value becomes zero. Thus, since it takes a time to turn off contactor 14, it is difficult to switch to the inverter power supply immediately after the voltage drop of AC power source 50 is detected. As a result of this, when switching from the power supply in the eco-mode to the inverter power supply, the voltage output to output terminal T4 is dropped momentarily, i.e., momentary voltage drop occurs, disadvantageously.

To address this, in the present embodiment, a degree of voltage drop of AC power source 50 is detected based on the output signal of voltage detection circuit 20, and on/off of the bypass circuit and the power conversion in inverter 9 are controlled in accordance with the detected degree of voltage drop. Accordingly, occurrence of momentary voltage drop is prevented upon switching power supply in the eco-mode to the inverter power supply.

Figure 3:
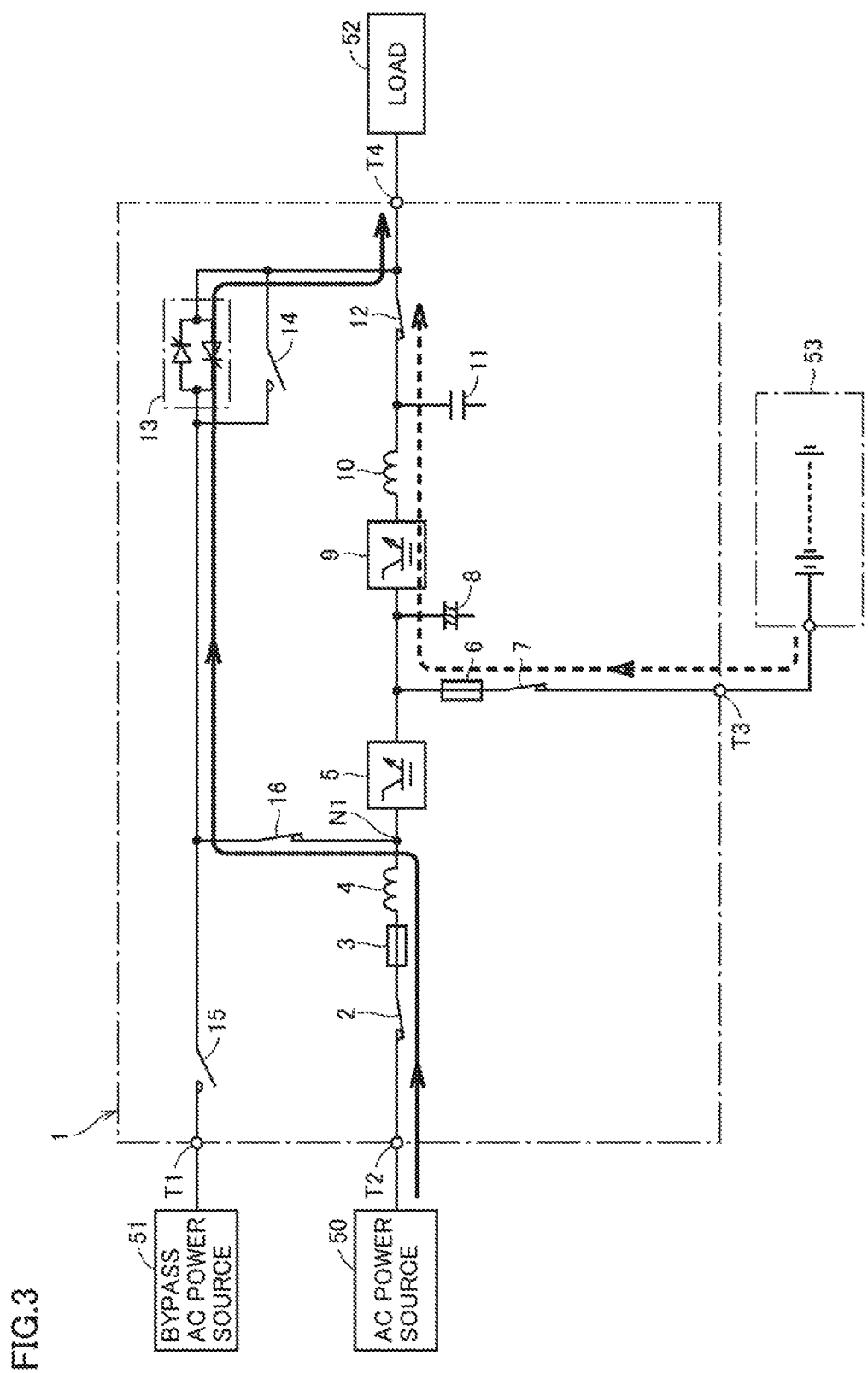
FIG. 3 illustrates a flow of power when voltage drop of an AC power source is detected during the execution of the eco-mode.

FIG. 3 illustrates a flow of power when the voltage drop of AC power source 50 is detected during the execution of the eco-mode. During the execution of the eco-mode, based on the output signal of voltage detection circuit 20, switching controller 17 detects voltage drop of AC power source 50 has occurred. Specifically, based on the output signal of voltage detection circuit 20, switching controller 17 detects an effective value of the three-phase AC voltage supplied from AC power source 50. Based on a deviation between the detected effective value of the three-phase AC voltage and a reference voltage, switching controller 17 calculates a degree of voltage drop (%) of AC power source 50. The reference voltage is set at the rated voltage of AC power source 50, for example. The degree of voltage drop is defined by dividing (i) the deviation of the effective value of the three-phase AC voltage from the reference voltage by (ii) the reference voltage.

During the execution of the eco-mode, switching controller 17 compares the degree of voltage drop of AC power source 50 with a first threshold value. The first threshold value is set at 5%, for example. When the degree of voltage drop of AC power source 50 reaches 5%, switching controller 17 sets control signal ϕD at the H level in order to turn on thyristor switch 13, and sets control signal ϕC at the L level in order to turn off contactor 14.

On this occasion, when control signal ϕD is set at the H level, thyristor switch 13 is turned on immediately. On the other hand, contactor 14 becomes off after passage of a predetermined response time from the setting of control signal ϕC at the L level. Hence, contactor 14 is turned off after thyristor switch 13 is turned on. Accordingly, the three-phase AC power supplied from AC power source 50 is led to output terminal T4 via node N1, contactor 16, and thyristor switch 13.

Then, switching controller 17 compares the degree of voltage drop of AC power source 50 with a second threshold value. The second threshold value is a value larger than the first threshold value, and is set at 10%, for example. When the degree of voltage drop of AC power source 50 reaches 10%, switching controller 17 supplies starting command ϕ9 to inverter 9 that is in the standby state. When inverter 9 is started in response to this starting command ϕ9, power conversion controller 19 outputs (i) the gate signal generated during the execution of the eco-mode to (ii) a gate drive circuit provided in inverter 9. Each of the semiconductor switching elements included in inverter 9 is turned on/off in accordance with the gate signal. Accordingly, inverter 9 converts the DC power of battery 53 into the three-phase AC power of commercial frequency as indicated by a dotted line arrow in FIG. 3. The three-phase AC power output from inverter 9 is supplied to output terminal T4.

When the inversion in inverter 9 is performed in response to starting command ϕ9 in this way, switching controller 17 sets control signal ϕD at the L level in order to turn off thyristor switch 13. Since thyristor switch 13 is turned off immediately after setting control signal ϕD at the L level, the voltage of output terminal T4 can be maintained at the three-phase AC voltage output from inverter 9 until thyristor switch 13 is turned off. Accordingly, when switching from the power supply in the eco-mode to the inverter power supply, the voltage output to output terminal T4 can be prevented from being dropped momentarily.

Figure 4:
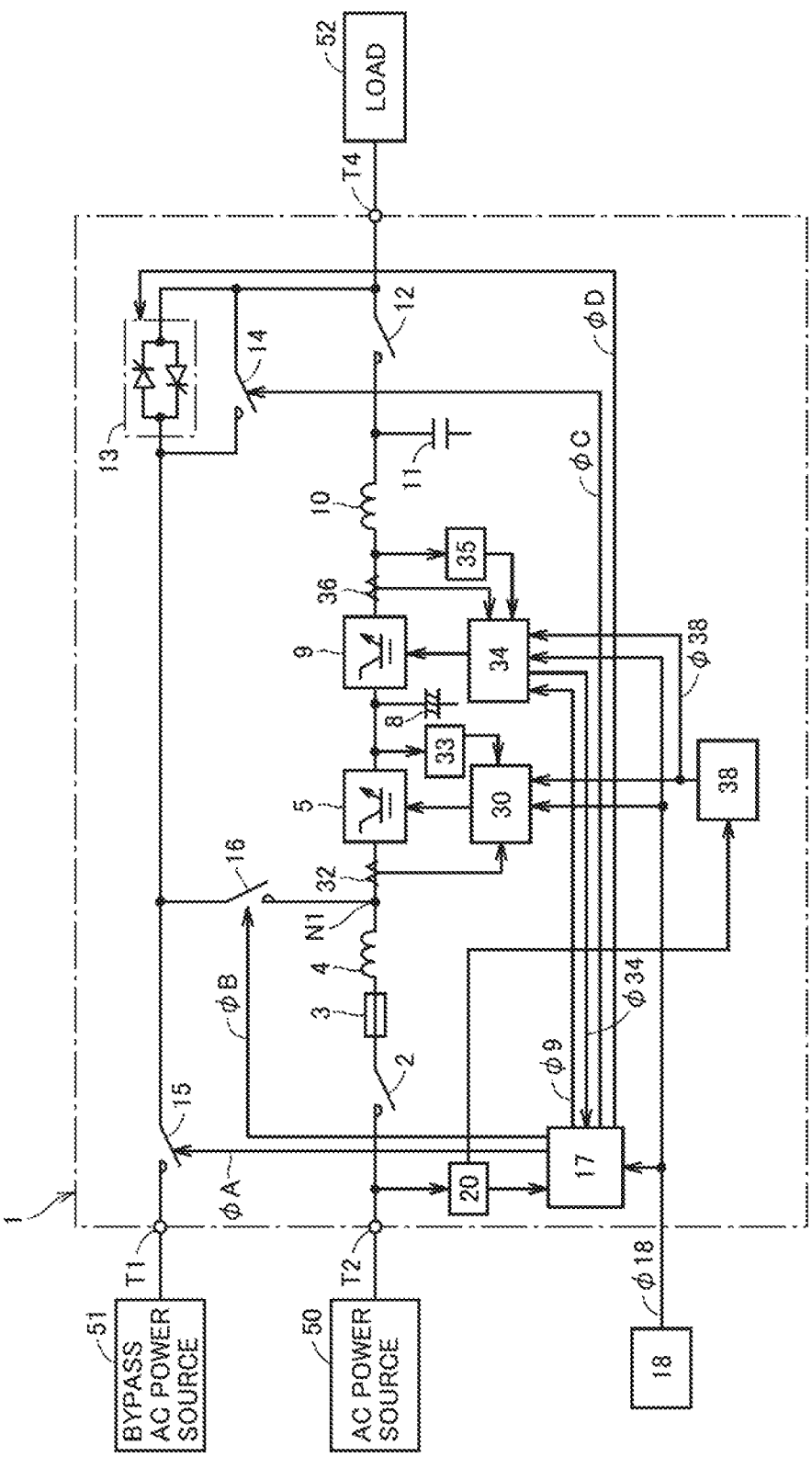
FIG. 4 is a function block diagram showing a control configuration for switching from the power supply in the eco-mode to the inverter power supply in the uninterruptible power source according to the first embodiment of the present invention.

FIG. 4 is a function block diagram showing a control configuration for switching from the power supply in the eco-mode to the inverter power supply in the uninterruptible power source according to the first embodiment of the present invention.

With reference to FIG. 4, power conversion controller 19 includes a converter control circuit 30, an inverter control circuit 34, voltage detection circuits 33, 35, and a sinusoidal wave generation circuit 38.

Voltage detection circuit 33 detects a voltage between the terminals of electrolytic capacitor 8, and provides the detected value to converter control circuit 30. When eco-mode setting signal ϕ18 is received from eco-mode setting unit 18, converter control circuit 30 controls, based on the output signals of current transformer 32 and voltage detection circuit 33, the rectification in converter 5 to supply predetermined DC voltage to battery 53.

Voltage detection circuit 35 detects the instantaneous value of the three-phase AC voltage output from inverter 9, and provides the detected value to inverter control circuit 34. Based on the output signal of voltage detection circuit 20, sinusoidal wave generation circuit 38 generates a sinusoidal wave signal ϕ38 having commercial frequency and predetermined amplitude, in synchronization with the three-phase AC voltage supplied from AC power source 50. This predetermined amplitude is set such that the effective value of sinusoidal wave signal ϕ38 becomes 90% of the rated voltage of AC power source 50, for example. It should be noted that 90% of the rated voltage of AC power source 50 corresponds to a compensation voltage that should be compensated by the uninterruptible power source during a malfunction of AC power source 50 (power failure or voltage drop). Sinusoidal wave generation circuit 38 provides generated sinusoidal wave signal ϕ38 to inverter control circuit 34.

When eco-mode setting signal ϕ18 is received from eco-mode setting unit 18, inverter control circuit 34 controls the inversion in inverter 9 based on (i) the output signals of current transformer 36 and voltage detection circuit 35 and (ii) sinusoidal wave signal ϕ38 from sinusoidal wave generation circuit 38. Specifically, inverter control circuit 34 generates a current command value based on a deviation between the output signal of voltage detection circuit 35 and sinusoidal wave signal ϕ38 generated in sinusoidal wave generation circuit 38. Further, when inverter control circuit 34 determines a deviation between the generated current command value and the output signal of current transformer 36, inverter control circuit 34 generates a voltage command value to eliminate the deviation. Based on the generated voltage command value, inverter control circuit 34 performs the PWM control on inverter 9. On this occasion, inverter control circuit 34 controls inverter 9 to synchronize the three-phase AC voltage detected by voltage detection circuit 35 to the three-phase AC voltage from AC power source 50.

During the execution of the eco-mode, through the PWM control, inverter control circuit 34 generates a gate signal for turning on/off the semiconductor switching element included in inverter 9. However, inverter control circuit 34 does not output the generated gate signal to the gate drive circuit provided in inverter 9. Accordingly, inverter 9 is not operated during the execution of the eco-mode, and is in the standby state (gate signal input waiting state). In this way, during the execution of the eco-mode, converter 5 converts (i) the three-phase AC power from AC power source 50 into (ii) DC power and supplies it to battery 53. On the other hand, inverter 9 is in the inversion standby state.

During the execution of the eco-mode, based on the output signal of voltage detection circuit 20, switching controller 17 detects voltage drop of AC power source 50 has occurred. Switching controller 17 calculates the degree of voltage drop of AC power source 50 based on the deviation between the effective value of the three-phase AC voltage detected by voltage detection circuit 20 and the reference voltage (rated voltage). When the degree of voltage drop of AC power source 50 reaches the first threshold value (for example, 5%), switching controller 17 provides starting command ϕ9 to inverter control circuit 34.

During the execution of the eco-mode, when starting command ϕ9 is received from switching controller 17, inverter control circuit 34 outputs the gate signal generated through the PWM control to inverter 9. Accordingly, inverter 9 converts (i) the DC power stored in battery 53 into (ii) the three-phase AC power of commercial frequency. Inverter 9 outputs a three-phase AC voltage having commercial frequency and predetermined amplitude, in synchronization with the three-phase AC voltage having been supplied from AC power source 50 before the occurrence of the power failure. The three-phase AC voltage output from inverter 9 is supplied to output terminal T4.

Next, switching controller 17 sets control signal ϕD at the L level in order to turn off thyristor switch 13. When control signal ϕD is set at the L level, thyristor switch 13 is turned off immediately. Accordingly, until thyristor switch 13 is turned off, the voltage of output terminal T4 can be maintained at the three-phase AC voltage output from inverter 9. Accordingly, when switching from the power supply in the eco-mode to the inverter power supply, the output voltage of output terminal T4 can be prevented from being dropped momentarily.

As described above, the uninterruptible power source according to the first embodiment is configured to control on/off of the bypass circuit and the inversion in inverter 9 in accordance with the degree of voltage drop of AC power source 50, whereby switching can be immediately made, without interruption, from the power supply in the eco-mode to the inverter power supply without being affected by the voltage drop of AC power source 50. In order to securely suppress the influence of the voltage drop of AC power source 50, each of the first and second threshold values is preferably set to switch to the inverter power supply before the voltage of AC power source 50 is dropped to fall below the compensation voltage of the uninterruptible power source (for example, 90% of the rated voltage of AC power source 50).

Further, the second threshold value for determining the timing for starting inverter 9 is preferably set such that phase and magnitude of the AC voltage output from inverter 9 become equal to phase and magnitude of the AC voltage supplied from AC power source 50. In the present embodiment, the second threshold value is set at 10% because the effective value of the output voltage of inverter 9 is assumed to be 90% of the rated voltage of AC power source 50 (compensation voltage). Accordingly, switching is made to the inverter power supply at a timing at which the voltage of AC power source 50 is dropped to the compensation voltage, whereby voltage equal to the compensation voltage can be supplied from inverter 9.

Figure 5:
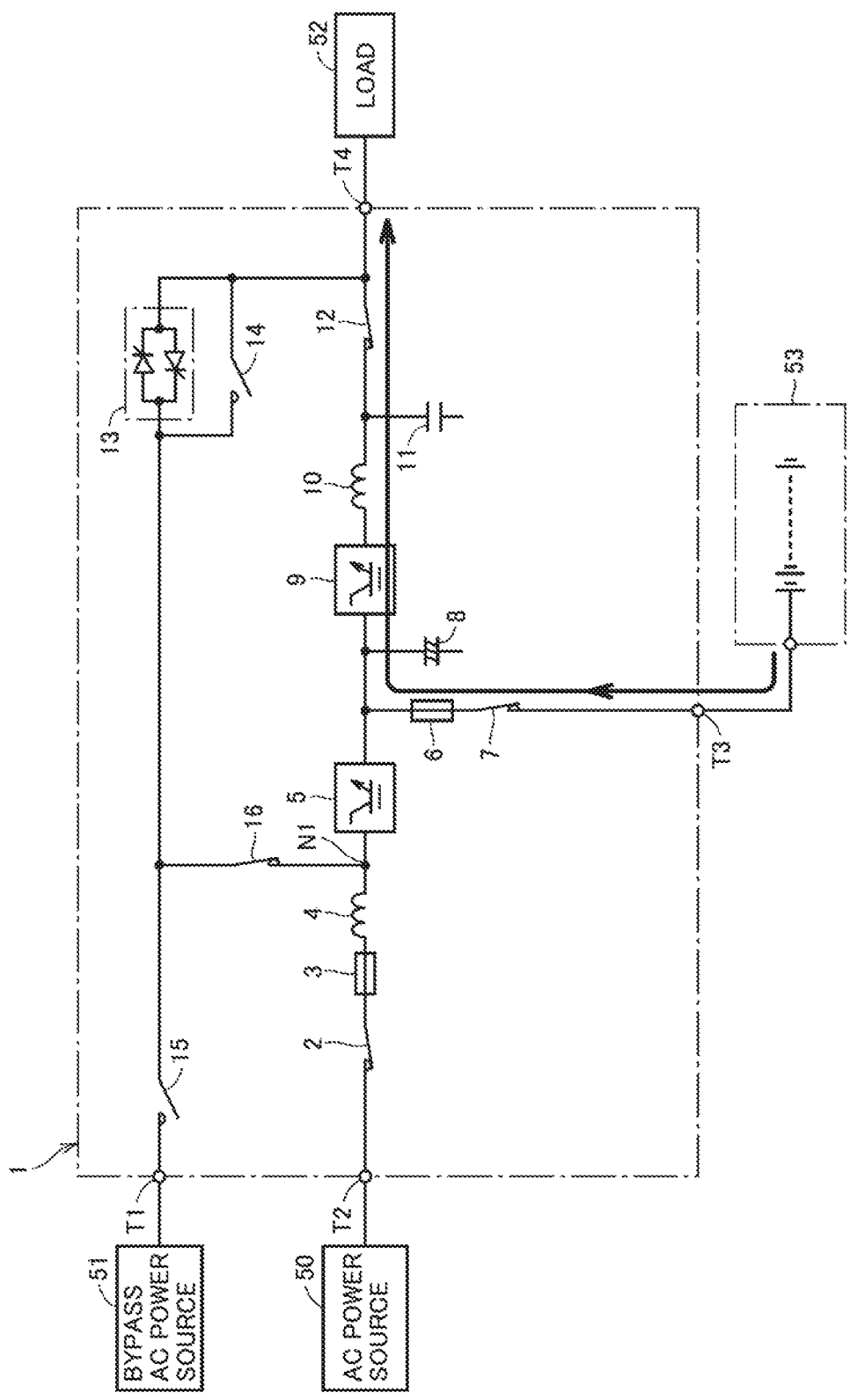
FIG. 5 illustrates a flow of power during the execution of the inverter power supply.

FIG. 5 illustrates a flow of power during the execution of the inverter power supply. With reference to FIG. 5, during the execution of the inverter power supply, in response to the control signal from switching controller 17, contactor 16 is turned on and contactors 15, 14 and thyristor switch 13 are turned off. Converter 5 is non-operational. Inverter 9 converts the DC power of battery 53 into the three-phase AC power of commercial frequency as indicated by a solid line arrow in FIG. 5. Inverter control circuit 34 stops the operation of inverter 9 when the remaining state of charges of battery 53 reaches a predetermined lower limit value. Accordingly, the uninterruptible power source ends the inverter power supply.

Figure 6:
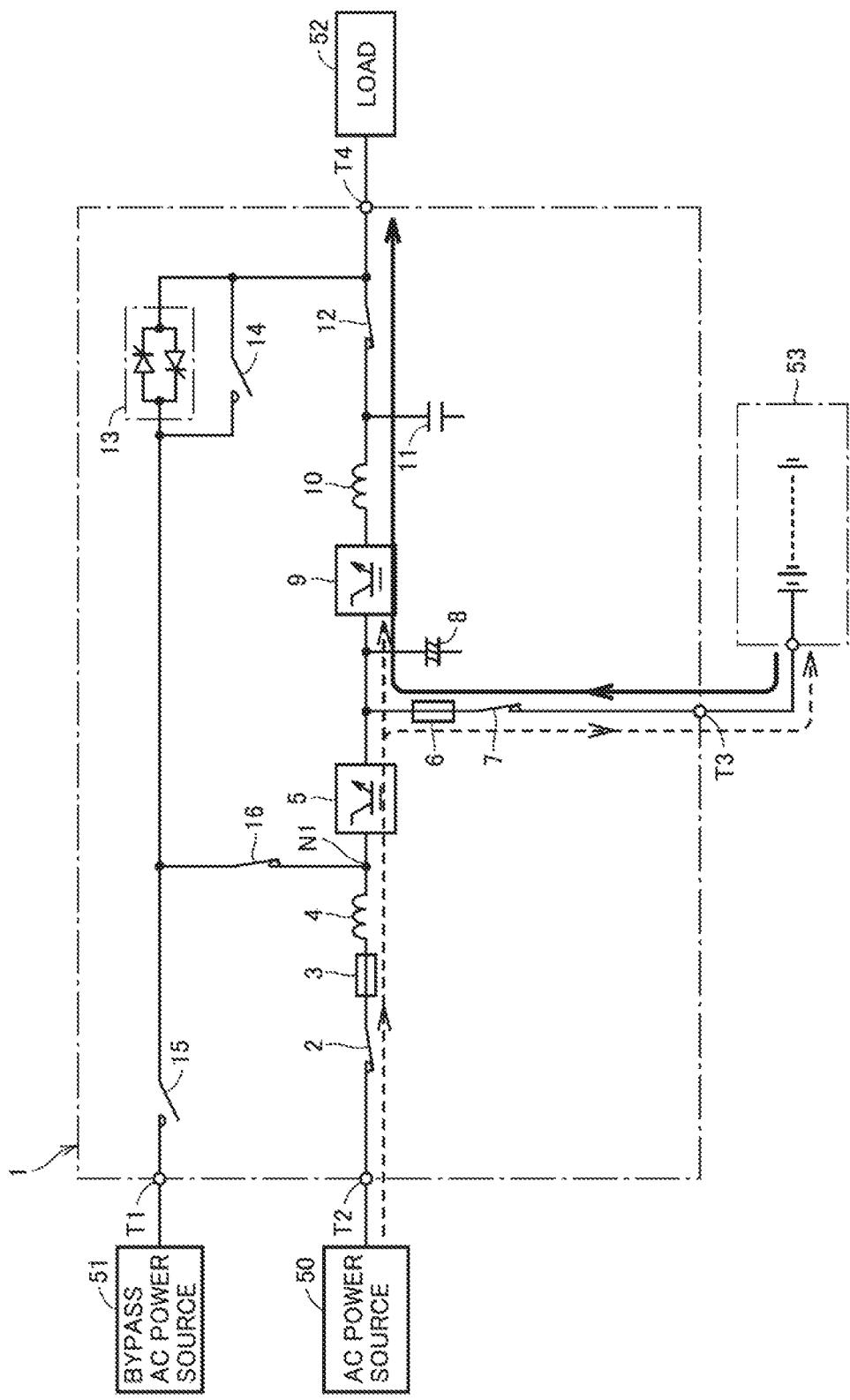
FIG. 6 illustrates a flow of power when power recovery of the AC power source is detected during the execution of the inverter power supply.

Further, the uninterruptible power source according to the first embodiment can automatically return from the inverter power supply to the power supply in the eco-mode when the supply of the three-phase AC power from AC power source 50 is resumed, i.e., when the supply of power is restarted during the execution of the inverter power supply. FIG. 6 illustrates a flow of power when the power recovery of AC power source 50 is detected during the execution of the inverter power supply. During the execution of the inverter power supply, switching controller 17 detects power recovery of AC power source 50 based on the output signal of voltage detection circuit 20. For example, switching controller 17 detects the power recovery of AC power source 50 when the effective value of the three-phase AC voltage detected by voltage detection circuit 20 becomes equal to or more than the predetermined threshold value.

When the power recovery of AC power source 50 is detected, switching controller 17 generates a starting command for starting converter 5. Switching controller 17 outputs the generated starting command to converter control circuit 30. When converter 5 is started in response to the starting command, converter control circuit 30 generates a gate signal for controlling the rectification in converter 5, and outputs it to converter 5. Accordingly, as indicated by a dotted line arrow in FIG. 6, converter 5 converts (i) the three-phase AC power supplied from AC power source 50 after the power recovery into (ii) DC power. The DC power generated by converter 5 is supplied to inverter 9 and battery 53.

Based on the output signal of voltage detection circuit 20, sinusoidal wave generation circuit 38 generates a sinusoidal wave signal ϕ38 having commercial frequency and predetermined amplitude, in synchronization with the three-phase AC voltage supplied from AC power source 50 after the power recovery. Sinusoidal wave generation circuit 38 provides generated sinusoidal wave signal ϕ38 to inverter control circuit 34.

Inverter control circuit 34 controls the inversion in inverter 9 based on (i) the output signals of current transformer 36 and voltage detection circuit 35 and (ii) sinusoidal wave signal ϕ38 from sinusoidal wave generation circuit 38. On this occasion, inverter control circuit 34 controls inverter 9 to synchronize (i) the three-phase AC voltage detected by voltage detection circuit 35 to (ii) the three-phase AC voltage supplied from AC power source 50 after the power recovery.

Here, if the phase of the three-phase AC voltage having been supplied from AC power source 50 before the power failure is deviated from the phase of the three-phase AC voltage supplied from AC power source 50 after the power recovery, the three-phase AC voltage output from inverter 9 after the power recovery may be abruptly varied by controlling inverter 9 to synchronize (i) the three-phase AC voltage detected by voltage detection circuit 35 as described above to (ii) the three-phase AC voltage supplied from AC power source 50. In such a case, the three-phase AC voltage supplied to load 52 via output terminal T4 becomes unstable, thus presumably affecting the operation of load 52. To address this, after the power recovery, inverter control circuit 34 gradually synchronizes the three-phase AC voltage output from inverter 9 to the three-phase AC voltage supplied from AC power source 50. Specifically, inverter control circuit 34 restricts an amount of change of the voltage command value between control periods to a predetermined upper limit value or less. This upper limit value is fitted through an experiment or the like so as not to affect the operation of load 52, for example.

Inverter control circuit 34 detects whether or not the three-phase AC voltage detected by voltage detection circuit 35 is in synchronization with the three-phase AC voltage supplied from AC power source 50, and provides switching controller 17 with a synchronization detection signal ϕ34 indicating the detected result. When the three-phase AC voltage detected by voltage detection circuit 35 is in synchronization with the three-phase AC voltage supplied from AC power source 50, synchronization detection signal ϕ34 is set at the H level, which is an activation level. On the other hand, when the three-phase AC voltage detected by voltage detection circuit 35 is not in synchronization with the three-phase AC voltage from AC power source 50, synchronization detection signal ϕ34 is set at the L level, which is a deactivation level.

When synchronization detection signal ϕ34 is activated at the H level, switching controller 17 sets control signal ϕD at the H level in order to turn on thyristor switch 13. Next, switching controller 17 sets control signal ϕC at the H level in order to turn on contactor 14. After passage of a predetermined response time from the setting of control signal ϕC at the Hl level, contactor 14 actually becomes on. Then, switching controller 17 sets control signal ϕD at the L level in order to turn off thyristor switch 13.

Further, inverter control circuit 34 stops the output of the gate signal to the gate drive circuit provided in inverter 9, thereby stopping the operation of inverter 9. Accordingly, the three-phase AC power is supplied from AC power source 50 to load 52 via contactor 14.

In this way, when supply of power from AC power source 50 is restarted, inverter control circuit 34 controls inverter 9 to synchronize (i) the three-phase AC voltage output from inverter 9 to (ii) the three-phase AC voltage supplied from AC power source 50 after the power recovery. Further, when the three-phase AC voltage output from inverter 9 synchronizes to the three-phase AC voltage supplied from AC power source 50, switching controller 17 switches from the inverter power supply to the power supply in the eco-mode by sequentially turning on thyristor switch 13 and contactor 14. Accordingly, when returning from the inverter power supply to the power supply in the eco-mode, the three-phase AC voltage supplied to load 52 can be prevented from being varied.

After the operation mode of the uninterruptible power source is returned to the eco-mode, inverter control circuit 34 continues to generate, through the PWM control, the gate signal for turning on/off the semiconductor switching element included in inverter 9. However, inverter control circuit 34 does not output the generated gate signal to inverter 9. Accordingly, inverter 9 is not operated during the execution of the eco-mode, and is in the inversion standby state.

As described above, according to the uninterruptible power source according to the first embodiment of the present invention, occurrence of momentary voltage drop can be prevented upon switching from the power supply in the eco-mode to the inverter power supply.

Moreover, when supply of power from the AC power source is restarted after changing over to the inverter power supply, the uninterruptible power source can automatically return to the power supply in the eco-mode while preventing the momentary voltage drop. Accordingly, the operation efficiency of the uninterruptible power source can be improved while securing stability of supply of power to the load.

It should be noted that in the first embodiment, the inverter power supply corresponds to a "first operation mode", and the eco-mode corresponds to a "second operation mode". Moreover, contactor 15 corresponds to a "first switch", contactor 16 corresponds to a "second switch", and contactor 2 corresponds to a "third switch". Thyristor switch 13 and contactor 14 constitute a "bypass circuit".

Figure 7:
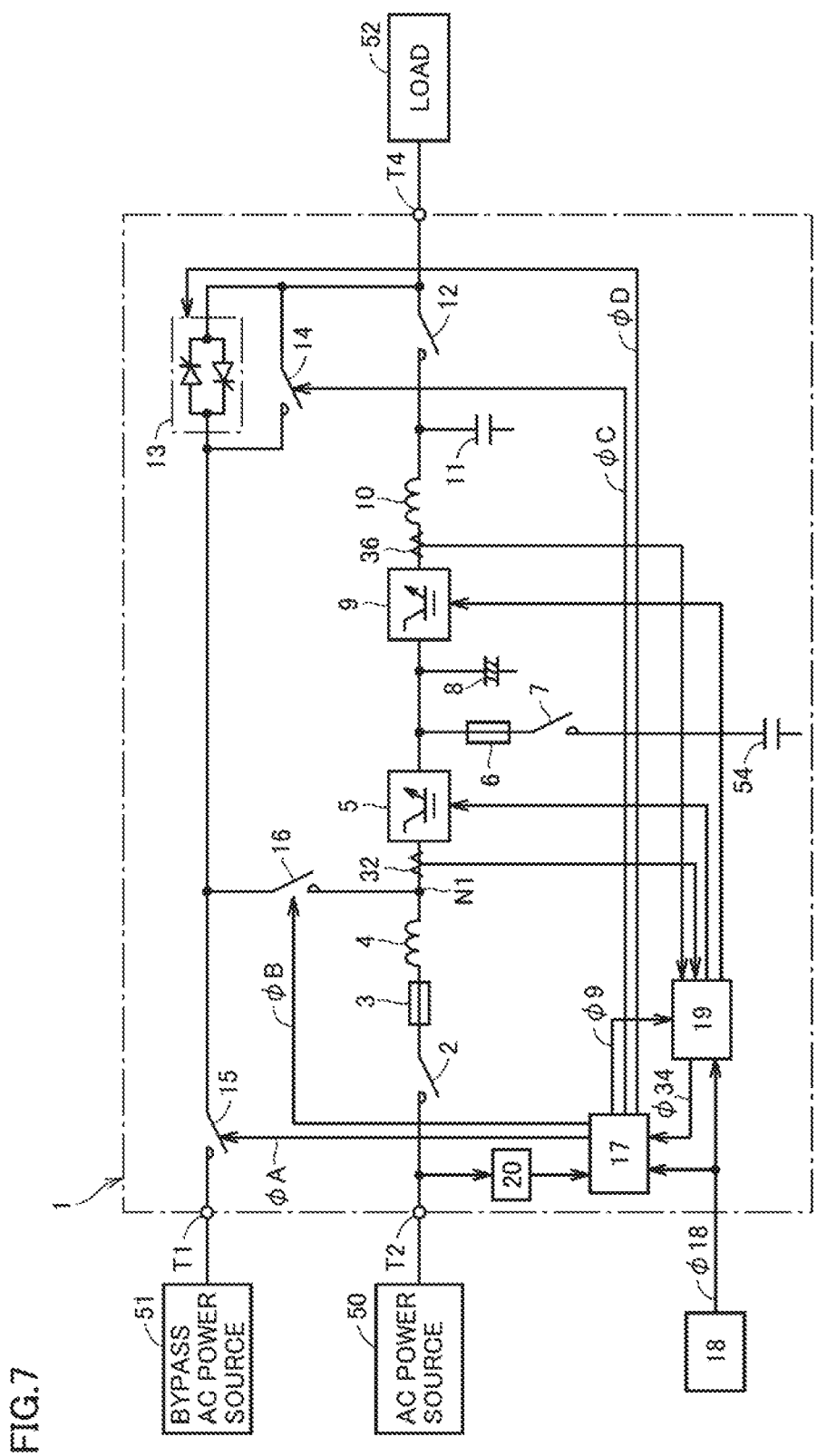
FIG. 7 is an entire configuration diagram showing another example of the configuration of the uninterruptible power source according to the first embodiment.

It should be noted that in the first embodiment, it has been illustrated that the power storage device for storing DC power is battery 53; however, a power storage element other than the battery such as an electric double layer capacitor 54 may be applied, as shown in FIG. 7, for example.

[Second Embodiment]

In the uninterruptible power source according to the first embodiment described above, it has been illustrated that the three-phase AC power is supplied from AC power source 50 to load 52 in the eco-mode; however, the three-phase AC power may be supplied from bypass AC power source 51. In the second embodiment of the present invention, the following describes a configuration in which the three-phase AC power from bypass AC power source 51 is supplied in the eco-mode.

Figure 8:
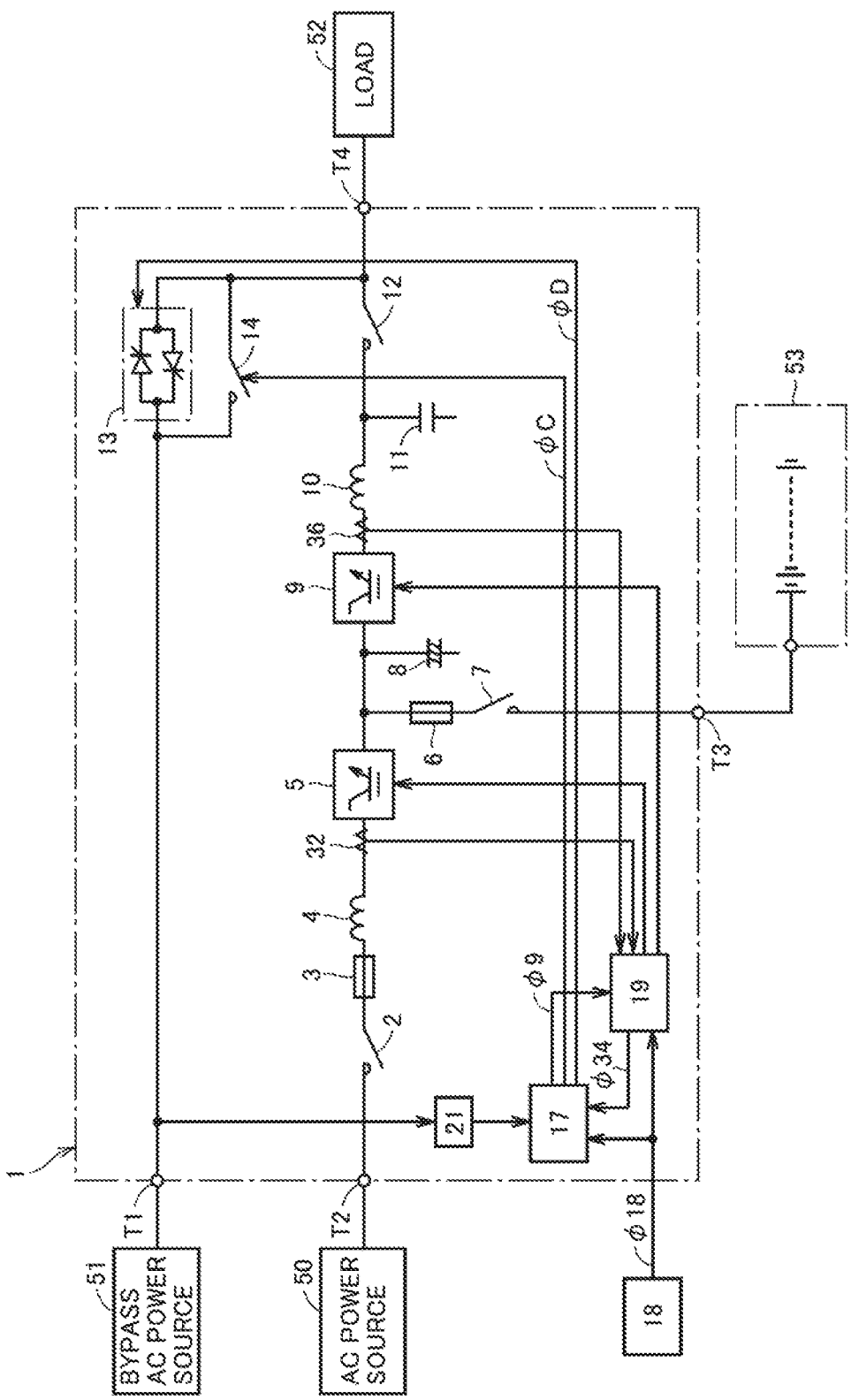
FIG. 8 is an entire configuration diagram of an uninterruptible power source according to a second embodiment of the present invention.

FIG. 8 is an entire configuration diagram of an uninterruptible power source according to a second embodiment of the present invention. The uninterruptible power source according to the second embodiment is obtained by (i) omitting contactors 15, 16 and (ii) providing a voltage detection circuit 21 in the uninterruptible power source according to the first embodiment shown in FIG. 1, instead of voltage detection circuit 20.

With reference to FIG. 8, when an eco-mode setting signal ϕ18 is received from eco-mode setting unit 18, switching controller 17 switches the operation mode from (i) the normal mode in which the three-phase AC power from AC power source 50 is supplied to load 52 via converter 5 and inverter 9 to (ii) the eco-mode in which the three-phase AC power from bypass AC power source 51 is supplied to load 52 via the bypass circuit.

Specifically, when eco-mode setting signal ϕ18 is received, switching controller 17 controls contactor 14 and thyristor switch 13 to form a power path between bypass AC power source 51 and load 52. When eco-mode setting signal ϕ18 is received, switching controller 17 sets control signal ϕD at the H level in order to turn on thyristor switch 13, and sets control signal ϕC at the H level in order to turn on contactor 14. When control signal ϕD is set at the H level, thyristor switch 13 is turned on immediately. On the other hand, after passage of a predetermined response time from the setting of control signal ϕC at the H level, contactor 14 becomes on. When contactor 14 becomes on, switching controller 17 sets control signal ϕD at the L level to turn off thyristor switch 13.

Figure 9:
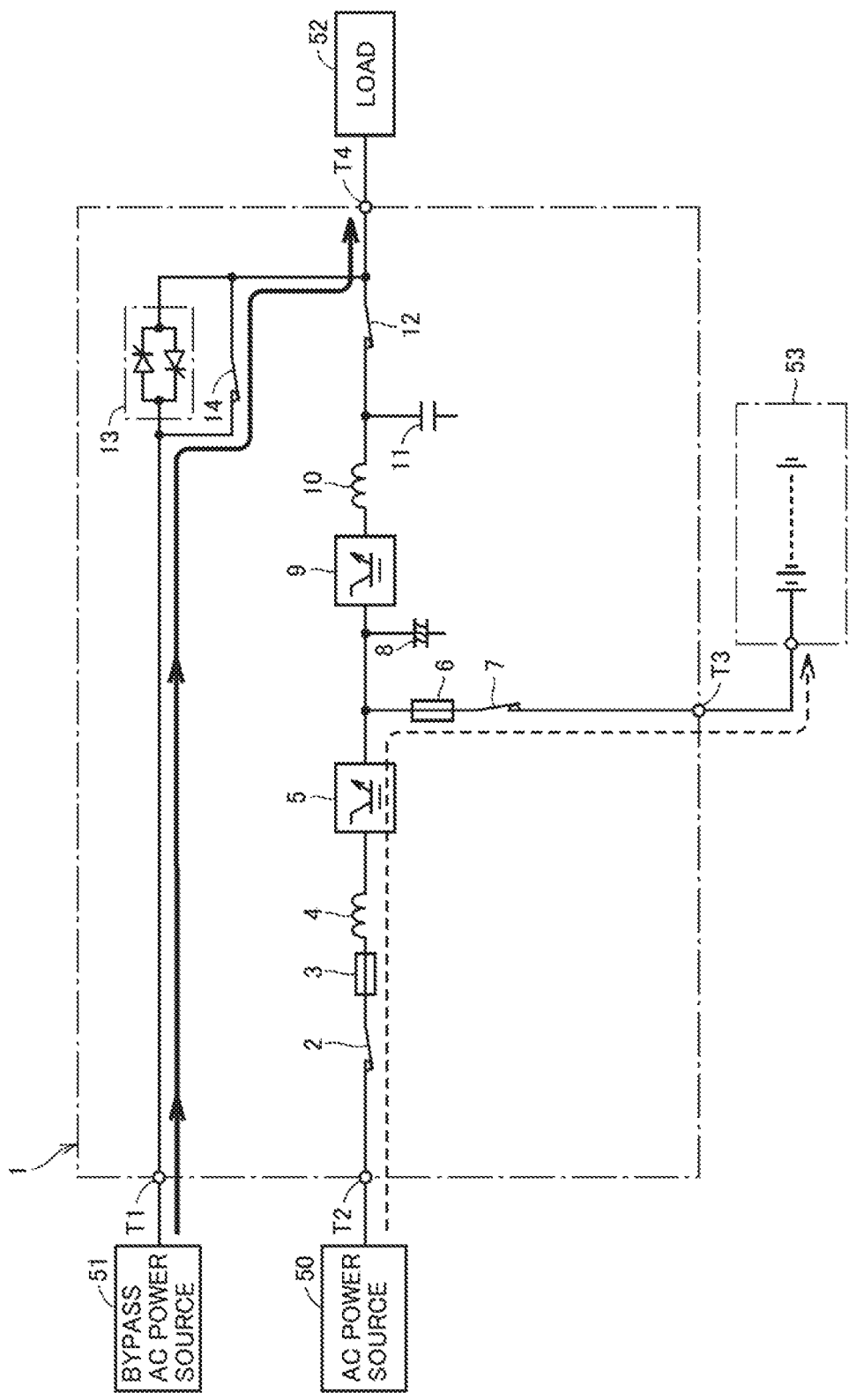
FIG. 9 illustrates a flow of power during execution of an eco-mode in the second embodiment of the present invention.

FIG. 9 illustrates a flow of power during execution of the eco-mode. In the eco-mode, as indicated by a solid line arrow in FIG. 9, three-phase AC power supplied from bypass AC power source 51 is supplied to load 52 via contactor 14.

When eco-mode setting signal ϕ18 is received from eco-mode setting unit 18, power conversion controller 19 operates converter 5 to store DC power in battery 53. Specifically, power conversion controller 19 controls rectification in converter 5 in accordance with the remaining state of charge in battery 53 in order to bring battery 53 into a predetermined fully charged state. Also during the execution of the eco-mode, converter 5 is operated as required, whereby DC power can be stored in battery 53 as indicated by a dotted line arrow in FIG. 9.

With reference to FIG. 8 again, power conversion controller 19 further generates a gate signal for turning on/off a semiconductor switching element included in inverter 9 during the execution of the eco-mode. Power conversion controller 19 generates a gate signal such that three-phase AC voltage synchronized to the three-phase AC voltage supplied from bypass AC power source 51 is output from inverter 9. However, power conversion controller 19 does not output the generated gate signal to the gate drive circuit provided in inverter 9 during the execution of the eco-mode. Hence, inverter 9 is not operated during the execution of the eco-mode, and is therefore in a standby state (gate signal input waiting state) until a gate signal is received from power conversion controller 19.

Voltage detection circuit 21 detects an instantaneous value of the three-phase AC voltage supplied from bypass AC power source 51, and provides switching controller 17 with a signal indicating the detected value. During the execution of the eco-mode, switching controller 17 detects voltage drop of bypass AC power source 51 based on the output signal of voltage detection circuit 21. When voltage drop of bypass AC power source 51 is detected, switching controller 17 generates a starting command ϕ9 for starting inverter 9 that is in the standby state. Switching controller 17 outputs generated starting command ϕ9 to power conversion controller 19. When inverter 9 is started in response to this starting command ϕ9, the uninterruptible power source is switched from the power supply in the eco-mode to the inverter power supply.

Figure 10:
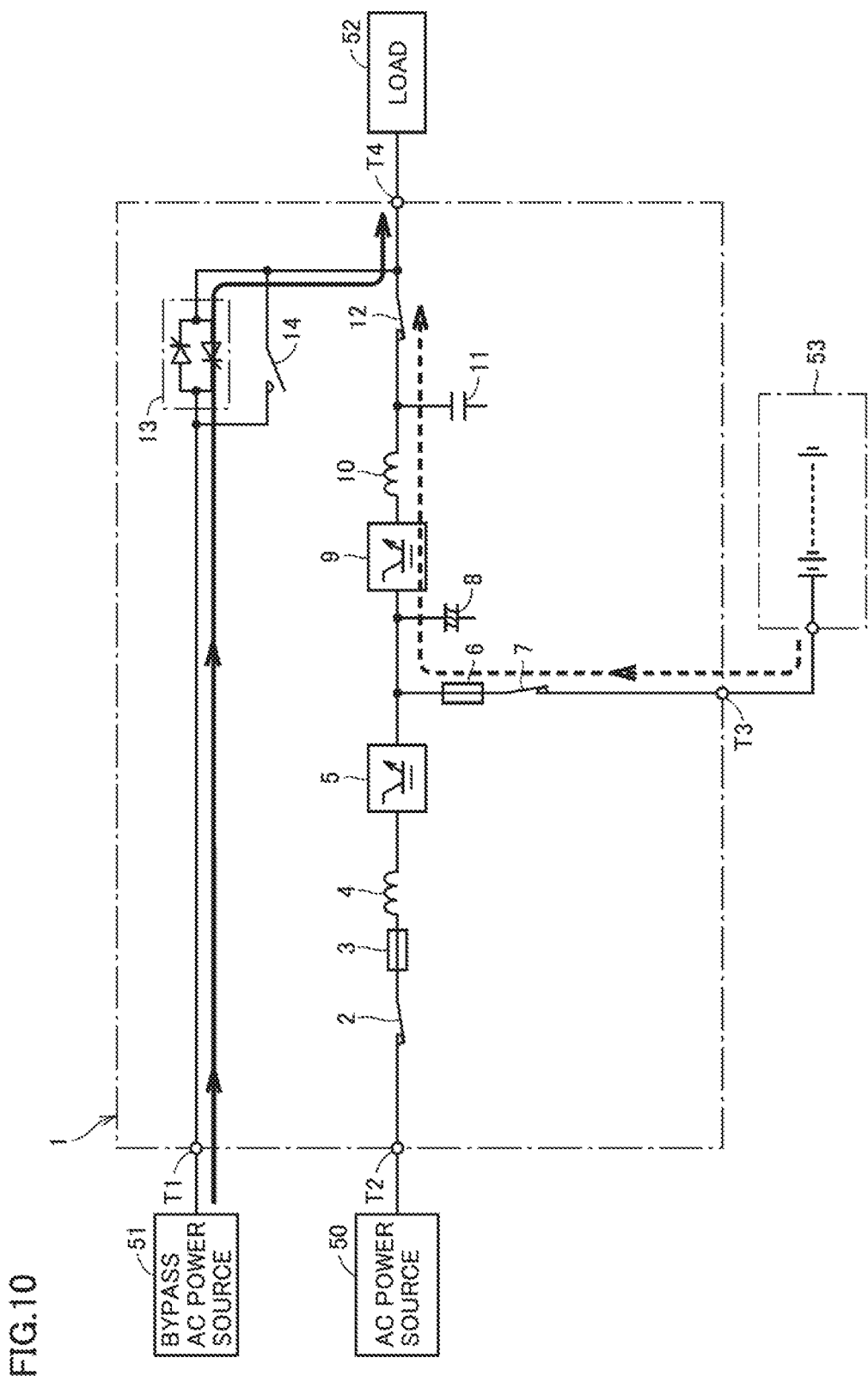
FIG. 10 illustrates a flow of power when voltage drop of a bypass AC power source is detected during the execution of the eco-mode.

FIG. 10 illustrates a flow of power when the voltage drop of bypass AC power source 51 is detected during the execution of the eco-mode. With reference to FIG. 10, during the execution of the eco-mode, based on the output signal of voltage detection circuit 21, switching controller 17 detects voltage drop of bypass AC power source 51. Specifically, based on the output signal of voltage detection circuit 21, switching controller 17 detects the effective value of the three-phase AC voltage supplied from bypass AC power source 51. Based on a deviation between the detected effective value of the three-phase AC voltage and the reference voltage, switching controller 17 calculates the degree of voltage drop of bypass AC power source 51. The reference voltage is set at the rated voltage of bypass AC power source 51, for example. The degree of voltage drop is defined by dividing (i) the deviation of the effective value of the three-phase AC voltage from the reference voltage by (ii) the reference voltage.

During the execution of the eco-mode, switching controller 17 compares the degree of voltage drop of bypass AC power source 51 with a first threshold value. The first threshold value is set at 5%, for example. When the degree of voltage drop of bypass AC power source 51 reaches 5%, switching controller 17 sets control signal φD at the H level in order to turn on thyristor switch 13, and sets control signal φC at the L level in order to turn off contactor 14.

On this occasion, when control signal φD is set at the H level, thyristor switch 13 is turned on immediately. On the other hand, contactor 14 becomes off after passage of a predetermined response time from the setting of control signal φC at the L level. Hence, contactor 14 is turned off after thyristor switch 13 is turned on. Accordingly, the three-phase AC power supplied from bypass AC power source 51 is led to output terminal T4 via thyristor switch 13.

Then, switching controller 17 compares the degree of voltage drop of bypass AC power source 51 with a second threshold value. The second threshold value is a value larger than the first threshold value, and is set at 10%, for example. When the degree of voltage drop of bypass AC power source 51 reaches 10%, switching controller 17 supplies starting command φ9 to inverter 9 that is in the standby state. When inverter 9 is started in response to this starting command φ9, power conversion controller 19 outputs (i) the gate signal generated during the execution of the eco-mode to (ii) a gate drive circuit provided in inverter 9. Each of the semiconductor switching elements included in inverter 9 is turned on/off in accordance with the gate signal. Accordingly, inverter 9 converts the DC power of battery 53 into the three-phase AC power of commercial frequency as indicated by a dotted line arrow in FIG. 10. The three-phase AC power output from inverter 9 is supplied to output terminal T4.

When the inversion in inverter 9 is performed in response to starting command φ9 in this way, switching controller 17 sets control signal φD at the L level in order to turn off thyristor switch 13. Since thyristor switch 13 is turned off immediately after setting control signal φD at the L level, the voltage of output terminal T4 can be maintained at the three-phase AC voltage output from inverter 9 until thyristor switch 13 is turned off. Accordingly, when switching from the power supply in the eco-mode to the inverter power supply, the voltage output to output terminal T4 can be prevented from being dropped momentarily.

Figure 11:
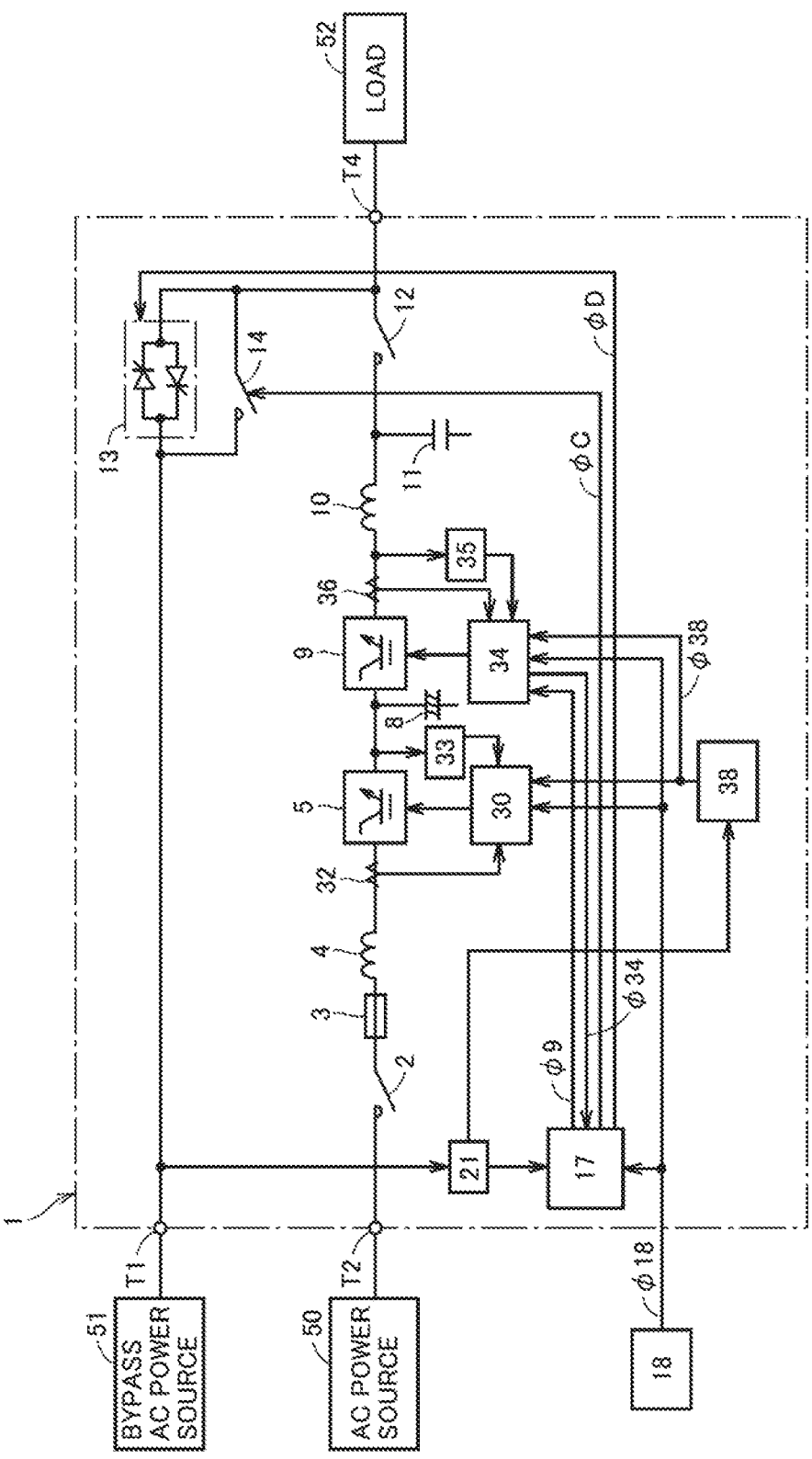
FIG. 11 is a function block diagram showing a control configuration for switching from the power supply in the eco-mode to the inverter power supply in the uninterruptible power source according to the second embodiment of the present invention.

FIG. 11 is a function block diagram showing a control configuration for switching from the power supply in the eco-mode to the inverter power supply in the uninterruptible power source according to the second embodiment of the present invention. With reference to FIG. 11, power conversion controller 19 includes a converter control circuit 30, an inverter control circuit 34, voltage detection circuits 33, 35, and a sinusoidal wave generation circuit 38.

Voltage detection circuit 33 detects a voltage between the terminals of electrolytic capacitor 8, and provides the detected value to converter control circuit 30. When eco-mode setting signal φ18 is received from eco-mode setting unit 18, converter control circuit 30 controls, based on the output signals of current transformer 32 and voltage detection circuit 33, the rectification in converter 5 to supply predetermined DC voltage to battery 53.

Voltage detection circuit 35 detects the instantaneous value of the three-phase AC voltage output from inverter 9, and provides the detected value to inverter control circuit 34. Based on the output signal of voltage detection circuit 21, sinusoidal wave generation circuit 38 generates a sinusoidal wave signal φ38 having commercial frequency and predetermined amplitude, in synchronization with the three-phase AC voltage supplied from bypass AC power source 51. This predetermined amplitude is set such that the effective value of sinusoidal wave signal φ38 becomes 90% of the rated voltage of bypass AC power source 51, for example. It should be noted that 90% of the rated voltage of bypass AC power source 51 corresponds to a compensation voltage that should be compensated by the uninterruptible power source during a malfunction of bypass AC power source 51. Sinusoidal wave generation circuit 38 provides generated sinusoidal wave signal φ38 to inverter control circuit 34.

When eco-mode setting signal φ18 is received from eco-mode setting unit 18, inverter control circuit 34 controls the inversion in inverter 9 based on (i) the output signals of current transformer 36 and voltage detection circuit 35 and (ii) sinusoidal wave signal φ38 from sinusoidal wave generation circuit 38. Specifically, inverter control circuit 34 generates a current command value based on a deviation between the output signal of voltage detection circuit 35 and sinusoidal wave signal φ38 generated in sinusoidal wave generation circuit 38. Further, when inverter control circuit 34 determines a deviation between the generated current command value and the output signal of current transformer 36, inverter control circuit 34 generates a voltage command value to eliminate the deviation. Based on the generated voltage command value, inverter control circuit 34 performs the PWM control on inverter 9. On this occasion, inverter control circuit 34 controls inverter 9 to synchronize (i) the three-phase AC voltage detected by voltage detection circuit 35 to (ii) the three-phase AC voltage supplied from bypass AC power source 51.

During the execution of the eco-mode, through the PWM control, inverter control circuit 34 generates a gate signal for turning on/off the semiconductor switching element included in inverter 9. However, inverter control circuit 34 does not output the generated gate signal to the gate drive circuit provided in inverter 9. Accordingly, inverter 9 is not operated during the execution of the eco-mode, and is in the standby state (gate signal input waiting state). In this way, during the execution of the eco-mode, converter 5 converts (i) the three-phase AC power from AC power source 50 into (ii) DC power and supplies it to battery 53. On the other hand, inverter 9 is in the inversion standby state.

During the execution of the eco-mode, based on the output signal of voltage detection circuit 21, switching controller 17 detects the voltage drop of bypass AC power source 51. Switching controller 17 calculates the degree of voltage drop of bypass AC power source 51 based on a deviation between (i) the effective value of the three-phase AC voltage detected by voltage detection circuit 21 and (ii) the reference voltage (rated voltage). When the degree of voltage drop of bypass AC power source 51 reaches the first threshold value (for example, 5%), switching controller 17 provides starting command φ9 to inverter control circuit 34.

When starting command φ9 is received from switching controller 17, inverter control circuit 34 outputs the gate signal generated through the PWM control during the execution of the eco-mode to inverter 9. Accordingly, inverter 9 converts (i) the DC power stored in battery 53 into (ii) the three-phase AC power of commercial frequency. Inverter 9 outputs a three-phase AC voltage having commercial frequency and predetermined amplitude, in synchronization with the three-phase AC voltage having been supplied from AC power source 50 before the occurrence of the power failure. The three-phase AC voltage output from inverter 9 is supplied to output terminal T4.

Next, switching controller 17 sets control signal φD at the L level in order to turn off thyristor switch 13. When control signal ϕD is set at the L level, thyristor switch 13 is turned off immediately. Accordingly, until thyristor switch 13 is turned off, the voltage of output terminal T4 can be maintained at the three-phase AC voltage output from inverter 9. Accordingly, when switching from the power supply in the eco-mode to the inverter power supply, the output voltage of output terminal T4 can be prevented from being dropped momentarily.

During the execution of the inverter power supply, in response to the control signal from switching controller 17, contactor 14 and thyristor switch 13 are turned off. Inverter 9 converts (i) the DC power of battery 53 into (ii) three-phase AC power of commercial frequency. Inverter control circuit 34 stops the operation of inverter 9 when the remaining state of charges of battery 53 reaches a predetermined lower limit value. Accordingly, the uninterruptible power source ends the inverter power supply.

Further, the uninterruptible power source according to the second embodiment can automatically return from the inverter power supply to the power supply in the eco-mode when the supply of the three-phase AC power from bypass AC power source 51 is resumed, i.e., when the supply of power is restarted during the execution of the inverter power supply. Specifically, during the execution of the inverter power supply, switching controller 17 detects power recovery of bypass AC power source 51 based on the output signal of voltage detection circuit 21. For example, switching controller 17 detects the power recovery of bypass AC power source 51 when the effective value of the three-phase AC voltage detected by voltage detection circuit 21 becomes equal to or more than the predetermined threshold value.

When the power recovery of bypass AC power source 51 is detected, sinusoidal wave generation circuit 38 generates, based on the output signal of voltage detection circuit 21, a sinusoidal wave signal ϕ38 having commercial frequency and predetermined amplitude, in synchronization with the three-phase AC voltage supplied from bypass AC power source 51 after the power recovery. Sinusoidal wave generation circuit 38 provides generated sinusoidal wave signal ϕ38 to inverter control circuit 34.

Inverter control circuit 34 controls the inversion in inverter 9 based on (i) the output signals of current transformer 36 and voltage detection circuit 35 and (ii) sinusoidal wave signal ϕ38 from sinusoidal wave generation circuit 38. On this occasion, inverter control circuit 34 controls inverter 9 to synchronize (i) the three-phase AC voltage detected by voltage detection circuit 35 to (ii) the three-phase AC voltage supplied from bypass AC power source 51 after the power recovery. It should be noted that as described in the first embodiment above, if the phase of the three-phase AC voltage having been supplied from bypass AC power source 51 before the power failure is deviated from the phase of the three-phase AC voltage supplied from bypass AC power source 51 after the power recovery, the three-phase AC voltage output from inverter 9 after the power recovery may be abruptly varied by controlling inverter 9 to synchronize (i) the three-phase AC voltage detected by voltage detection circuit 35 as described above to (ii) the three-phase AC voltage supplied from bypass AC power source 51. Therefore, after the power recovery, inverter control circuit 34 gradually synchronizes the three-phase AC voltage output from inverter 9 to the three-phase AC voltage supplied from bypass AC power source 51. Specifically, inverter control circuit 34 restricts an amount of change of the voltage command value between control periods to a predetermined upper limit value or less. This upper limit value is fitted through an experiment or the like so as not to affect the operation of load 52, for example.

Inverter control circuit 34 detects whether or not the three-phase AC voltage detected by voltage detection circuit 35 is in synchronization with the three-phase AC voltage supplied from bypass AC power source 51, and provides switching controller 17 with a synchronization detection signal ϕ34 indicating the detected result. When the three-phase AC voltage detected by voltage detection circuit 35 is in synchronization with the three-phase AC voltage supplied from bypass AC power source 51, synchronization detection signal ϕ34 is set at the H level, which is an activation level. On the other hand, when the three-phase AC voltage detected by voltage detection circuit 35 is not in synchronization with the three-phase AC voltage from bypass AC power source 51, synchronization detection signal ϕ34 is set at the L level, which is a deactivation level.

When synchronization detection signal ϕ34 is activated at the H level, switching controller 17 sets control signal ϕD at the H level in order to turn on thyristor switch 13. Next, switching controller 17 sets control signal ϕC at the H level in order to turn on contactor 14. After passage of a predetermined response time from the setting of control signal ϕC at the H level, contactor 14 actually becomes on. Then, switching controller 17 sets control signal ϕD at the L level in order to turn off thyristor switch 13.

Further, inverter control circuit 34 stops the output of the gate signal to the gate drive circuit provided in inverter 9, thereby stopping the operation of inverter 9. Accordingly, the three-phase AC power is supplied from AC power source 50 to load 52 via contactor 14.

In this way, when supply of power from bypass AC power source 51 is restarted, inverter control circuit 34 controls inverter 9 to synchronize (i) the three-phase AC voltage output from inverter 9 to (ii) the three-phase AC voltage supplied from bypass AC power source 51 after the power recovery. Further, when the three-phase AC voltage output from inverter 9 is in synchronization with the three-phase AC voltage supplied from bypass AC power source 51, switching controller 17 switches from the inverter power supply to the power supply in the eco-mode by sequentially turning on thyristor switch 13 and contactor 14. Accordingly, when returning from the inverter power supply to the power supply in the eco-mode, the three-phase AC voltage supplied to load 52 can be prevented from being varied.

After the operation mode of the uninterruptible power source is returned to the eco-mode, inverter control circuit 34 continues to generate, through the PWM control, the gate signal for turning on/off the semiconductor switching element included in inverter 9. However, inverter control circuit 34 does not output the generated gate signal to inverter 9. Accordingly, inverter 9 is not operated during the execution of the eco-mode, and is in the inversion standby state.

As described above, according to the uninterruptible power source according to the second embodiment of the present invention, occurrence of momentary voltage drop can be prevented upon switching from the power supply in the eco-mode to the inverter power supply.

Moreover, when supply of power from the AC power source is restarted after changing over to the inverter power supply, the uninterruptible power source can automatically return to the power supply in the eco-mode while preventing the momentary voltage drop. Accordingly, the operation efficiency of the uninterruptible power source can be improved while securing stability of supply of power to the load.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: housing; 2, 7, 12, 14, 15, 16: contactor; 3, 6: fuse; 4, 10: reactor; 5: converter; 8: electrolytic capacitor; 9: inverter; 11: capacitor; 13: thyristor switch; 17: switching controller; 18: eco-mode setting unit; 19: power conversion controller; 20, 21, 22, 33, 35: voltage detection circuit; 30: converter control circuit; 32, 36: current transformer; 34: inverter control circuit; 50: AC power source; 51: bypass AC power source; 52: load; 53: battery; 54: electric double layer capacitor.

The invention claimed is:

1. An uninterruptible power source connected between an AC power source and a load, the uninterruptible power source comprising:
a converter configured to rectify AC power supplied from the AC power source into DC power;
an inverter configured to invert the DC power output by the converter or DC power output by a power storage device into AC power, and to supply the AC power to the load;
a bypass circuit including a semiconductor switch and a contactor connected in parallel between the AC power source and the load;
a power conversion controller configured to control the power conversion in each of the converter and the inverter; and
a switching controller configured to control on/off of the semiconductor switch and the contactor,
the uninterruptible power source having (i) a first operation mode in winch AC power is supplied from the inverter to the load and (ii) a second operation mode in which AC power is supplied from the AC power source to the load via the bypass circuit, the uninterruptible power source being configured to change over to the first operation mode when voltage drop of the AC power source is detected during the second operation mode,
in the second operation mode, the switching controller being configured to turn on the contactor and turn off the semiconductor switch, and being configured to turn on the semiconductor switch and then turn off the contactor when a degree of voltage drop of the AC power source reaches a first threshold value,
when the degree of voltage drop of the AC power source reaches the second threshold value smaller than the first threshold value during the second operation mode, the power conversion controller being configured to (i) control the inverter to invert the DC power output by the power storage device into AC power and (ii) control the inversion in the inverter to synchronize the AC voltage output from the inverter to the AC voltage supplied from the AC power source,
the switching controller being configured to turn of the semiconductor witch when the power conversion controller controls the inverter to perform the inversion after turning off the contactor.

2. The uninterruptible power source according to claim 1, wherein
the power conversion controller is configured to generate a gate signal for controlling the inverter to synchronize the AC voltage output from the inverter to the AC voltage supplied from the AC power source, and
in the second operation mode, the power conversion controller is configured to bring the inverter into an inversion standby state by stopping output Of the gate signal, and is configured to output the gate signal to the inverter when the degree of voltage drop of the AC power source reaches the second threshold value.

3. The uninterruptible power source according to claim 1, wherein
when detecting power recovery to resume the supply of the AC power from the AC power source after changing over to the first operation mode, the uninterruptible power source is configured to return to the second operation mode,
in the first operation mode, in response to detecting the power recovery of the AC power source, the power conversion controller is configured to control the inversion in the inverter to synchronize the AC voltage output from the inverter to the AC voltage supplied from the AC power source after the power recovery, and
when the AC voltage output from the inverter synchronizes to the AC voltage supplied from the AC power source after the power recovery, the switching controller is configured to sequentially turn on the semiconductor switch and the contactor and turn off the semiconductor switch after the contactor is turned on.

4. The uninterruptible power source according to claim 1, further comprising:
an input terminal configured to receive AC power from the AC power source and supply the AC power to the converter;
a bypass terminal configured to receive AC power from the AC power source;
a first switch connected between the bypass terminal and the bypass circuit;
a second switch connected between a first node and the bypass circuit, the first node being located between the input terminal and an AC terminal of the converter; and
a third switch connected between the input terminal and the first node, wherein
in the second operation mode, the switching controller is configured to supply, to the load via the contactor, the AC power supplied to the input terminal, by turning on the second and third switches and turning off the first switch.

5. The uninterruptible power source according to claim 1, further comprising:
an input terminal configured to receive AC power from the AC power source and supply the AC power to the converter; and
a bypass terminal configured to receive AC power from the AC power source and supply the AC power to the bypass circuit, wherein
in the second operation mode, the switching controller is configured to supply, to the load via the contactor, the AC power supplied to the bypass terminal.

* * * * *